United States Patent [19]

Tamai et al.

[11] 4,274,822
[45] Jun. 23, 1981

[54] APPARATUS FOR FORMING SEAL LINERS OF THERMOPLASTIC MATERIAL WITHIN CLOSURE CAP SHELLS

[75] Inventors: Shuichi Tamai, Osaka; Norihide Matsuyama, Toyonaka, both of Japan

[73] Assignee: Osaka Nagayanagi Cork Ind., Co., Ltd., Osaka, Japan

[21] Appl. No.: 70,638

[22] Filed: Aug. 28, 1979

[30] Foreign Application Priority Data

Aug. 28, 1978 [JP] Japan ............................. 53-105073

[51] Int. Cl.³ ............................................. B29D 27/00
[52] U.S. Cl. .................................... 425/127; 264/46.6; 264/46.9; 264/268; 425/812; 425/817 R
[58] Field of Search .................... 425/127, 812, 817 R; 264/46.6, 268, 46.9

[56] References Cited

U.S. PATENT DOCUMENTS

| | | | |
|---|---|---|---|
| 1,196,974 | 9/1916 | Pearson | 425/127 |
| 2,359,674 | 10/1944 | Pollock | 425/812 X |
| 2,745,135 | 5/1956 | Gora | 264/268 X |
| 3,135,019 | 6/1964 | Aichele | 264/268 X |
| 3,261,895 | 7/1966 | Strickman | 264/46.6 |
| 3,265,785 | 8/1966 | Rainer | 264/46.6 |
| 3,366,723 | 1/1968 | Green | 264/268 |
| 3,547,746 | 12/1970 | Gwinner | 264/268 X |
| 3,674,393 | 7/1972 | Busi | 264/268 X |
| 4,088,730 | 5/1978 | Wilde | 264/268 |

FOREIGN PATENT DOCUMENTS 48-19386 6/1973 Japan ............................. 264/46.6

Primary Examiner—Philip Anderson
Attorney, Agent, or Firm—Birch, Stewart, Kolasch & Birch

[57] ABSTRACT

An apparatus for forming seal liners of thermoplastic material within closure cap shells comprisies: a plurality of movable dies each having an inner die and an annular outer die both of which are movable up and down in relatively slidable relation with each other and arranged so that the inner die takes its lowermost position after the outer die has taken its lowermost position; means for restricting downward movement of the outer die so as to provide a constant clearance between its lower end and an internal surface of a cap shell to be worked with, so that an annular foaming chamber of a constant capacity is formed beneath the lower end of the outer die; and a plurality of gas discharging grooves are provided so as to be communicated with the foaming chamber.

14 Claims, 10 Drawing Figures

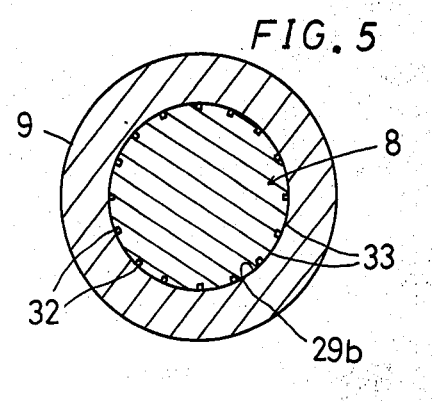
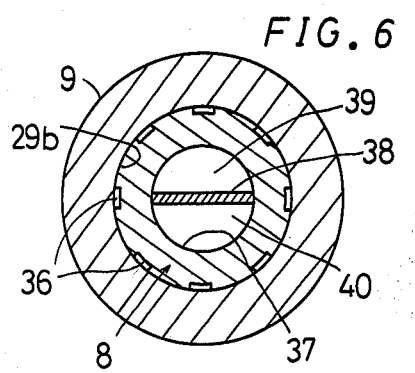
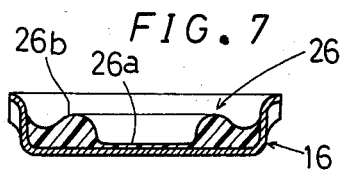
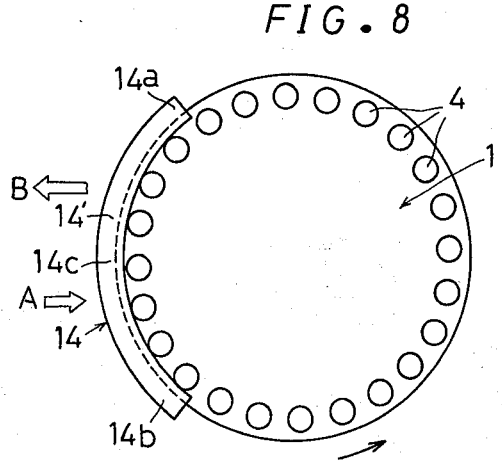
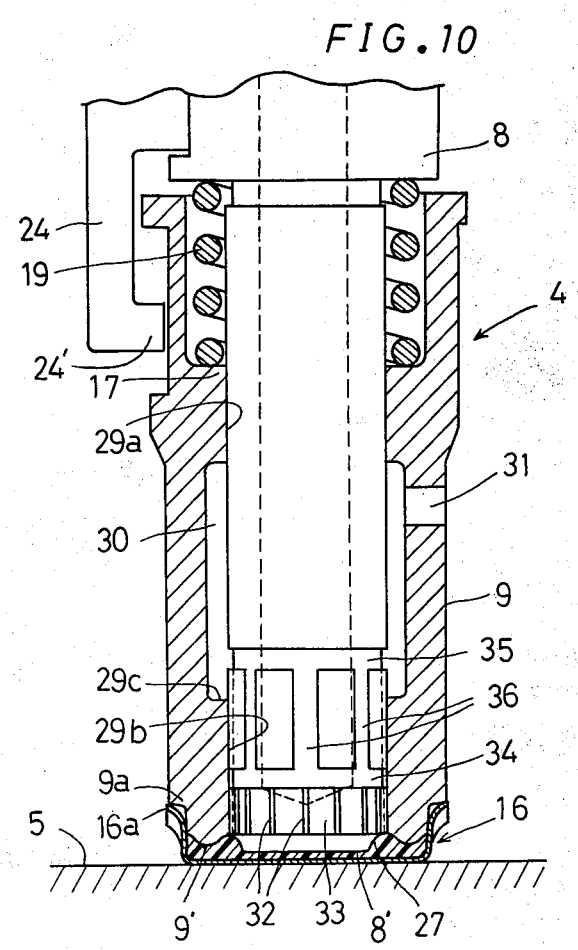

APPARATUS FOR FORMING SEAL LINERS OF THERMOPLASTIC MATERIAL WITHIN CLOSURE CAP SHELLS

BACKGROUND AND SUMMARY OF THE INVENTION

This invention relates to an apparatus for forming seal liners within closure cap shells, and more particularly to the apparatus for applying resilient seal liners of foamed thermoplastic material, in particular polyethylene, to closure caps of the crown type for use in sealing bottles and the like.

It has been customary to apply cork liners to the crown type caps for sealing bottles and the like. However, the price of the natural cork is becoming more and more expensive. In addition, it is not very easy to firmly secure the cork liners within the cap shells. Thus, an attempt has been made to utilize resilient thermoplastic liners in place of cork liners, as disclosed in U.S. Pat. No. 2,654,913. Further, U.S. Pat. Nos. 3,135,019 and 3,360,827, disclose apparatus for producing seal liners by automatically depositing a measured charge of fused thermoplastic material without a foaming agent into each cap shell and then shaping the material into a seal liner by means of a molding plunger. However, the non-foamed thermoplastic seal liners thus obtained are inferior in cushioning and following properties as compared to natural cork liners and, therefore, have such a disadvantage that they occasionally cause an imperfect sealing effect. In order to eliminate the above disadvantage, an improved technique of making the seal liners of foamed plastics has been proposed, for example, in U.S. Pat. No. 3,265,785 to Rainer et al, in which the mixture of thermoplastic material and a foaming agent is fed into a cap shell and then roughly formed into a desired shape of liner by inserting a forming die or plunger into the cap shell, and then, after the plunger being removed, the roughly shaped liner is heated in order to activate the foaming agent contained beforehand in said mixture at free state (the state where the material is not pressurized by the plunger) by means of infrared-rays lamps or the like. However, according to the invention of Rainer et al, because the plastic material is foamed at free state, not only the cells in the foamed plastic are not uniform in size and distribution, but also uniform size and configuration of the formed liner cannot be obtained, these being very disadvantageous.

In order to overcome the above disadvantages, an improved method has been proposed in Japanese Patent Publication No. 48-19386 (corresponding to U.S. Ser. No. 846,027 filed July 30, 1969, W. C. Gwinner), in which a mixture of a thermoplastic resin composition and a heat activatable foaming agent is heated to activate the foaming agent and to furnish a heated, fused, foamed plastic mass, which is, in heated condition, deposited in a closure cap shell by means of an extruder, and then a cold or unheated molding die or plunger is applied under pressure to the deposited mass in the cap shell to mold a foamed seal liner. However, according to this method of Gwinner, because the mixture of the resin and the activated foaming agent is confined between the plunger and the cap shell, the produced gas is prevented from being discharged, causing irregular shapes of the formed liners.

In order to solve the above problem, the inventors of the present invention have proposed to provide a plurality of gas discharging bores in a single piece type forming die or plunger as disclosed in Japanese Laid-open No. 53-69786 of June 21, 1978 (Patent Applicaton No. 51-144383 filed Nov. 30, 1976). The plunger disclosed therein has such a lower cylindrical portion whose external diameter is equal to the internal diameter of a cap shell, the bottom surface of said lower cylindrical portion being formed with an annular groove or recess which is communicated with atmosphere through a plurality of inclined narrow gas discharging bores formed in the body of the plunger, wherein a mixture of thermoplastic polyethylene resin and a foaming agent is radially spread by the downward stroke of the plunger, and when the plunger takes its predetermined lowermost position, the resin is molded into a desired shape of the seal liner while the produced gas is discharged through the bores. However, there occurs such a problem that the narrow inclined bores are likely to be choked up and it is quite troublesome to remove the choking material out of each inclined bore. In addition, it is not easy to provide the narrow, inclined bores in the plunger body.

Further, it is known that, when thermoplastic resin in foamed by a foaming agent within a constant, preclosed foaming space or room, produced cells of the seal liners are generally uniform in size and distribution. However, each of the above-referred forming dies or plungers disclosed in Japanese Patent Publication No. 48-19386 (U.S. Ser. No. 846,027) and Japanese Laid-open No. 53-69786 (Patent Application No. 51-144383) has such a construction that the flat central portion, which makes the charged resin radially spread and forms a thin disk-shaped central portion of the seal liner, and the annular recessed portion, which surrounds said flat central portion and forms a thicker annular pad portion of the seal liner, are integrally formed on a single piece of die or plunger, resulting in that the molding of the thin disk-shaped central portion of the liner and that of the thicker annular pad portion of the liner are simultaneously performed. Thus, in a strict sense, the molding of the thicker annular pad portion of the liner is not carried out under constant pre-closed condition. As a result, the cells in the thicker annular pad portion of the liner thus obtained are excessively large in size.

A seal liner molding device disclosed in U.S. Pat. No. 3,135,019 to Aichele was not intended to utilize foamed plastics. However, if foamed plastics be utilized with the Aichele device, it also has a disadvantage similar to that of the above referred Japanese Patent Publication No. 48-19386 and Japanese Laid-open No. 53-69786. The molding device of Aichele comprises a knife edged fender sleeve arranged so as to cover the side walls of the cap shell, an upwardly yieldable seal cushion die, and a punch for spreading a measured amount of thermoplastic material over and upon the interior surface of a cap shell, wherein the spreading application of the thermoplastic material by the punch operates to crowd a portion of the material toward the fender sleeve, resulting in that the material so forced is brought into engagement with the upwardly yieldable seal cushion forming die, whereby the material enters beneath and thrusts the die upwardly against tension of a spring acting upon the die, with the effect of providing the seal liner formation of a thickened annular cushion portion. However, if the thermoplastic material is foamed when the forming die is moved upward, it is impossible to provide a constant, closed space or room required for formation of uniform cellular organization in the seal liners. As a result, the cells in the seal liner thus obtained are not uniform in size and distribution.

It is, therefore, an object of the present invention to provide an improved apparatus for forming seal liners of foamed thermoplastic material within crown type cap shells which is capable of forming cells as uniform in size and distribution in the foamed seal liners by performing foaming operation within a constant closed foaming space or room.

Another object of the invention is to provide the seal liner forming apparatus having a movable die consisting of an inner cylindrical forming die or plunger and an outer, annular forming die, at least one of the two dies having a plurality of axially extending gas discharging grooves formed in its cylindrical slidable surface, the grooves being constructed and arranged for easy formation and maintenance (clearing), good efficiency in gas-discharging and easy prevention from being clogged up.

A further object of the invention is to provide the seal liner forming apparatus in which each outer annular forming die is so arranged that when it takes the lowermost position, a clearance between the bottom end surface of the die and an interior surface of a cap shell is always constant.

A still further object of the invention is to provide the seal liner forming apparatus which permits desired uniformity in cellular organization of the formed seal liner as well as efficiency in mass-production by regulating formation of cellular organization in the seal liner by simultaneously cooling the movable die and the stationary die which supports the underside of a cap shell.

A further object of the invention is to provide the seal liner forming apparatus which permits mass-production and uniform quality of the seal liners, by provision of a cooling water flow regulating means operable in accordance with temperature, operating time and other operating conditions when the movable forming die and the stationary die are cooled down.

Other objects, features and advantages of the invention will become apparent from the detailed description given hereinbelow in connection with the accompanying drawings. It should be understood, however, that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

In the accompanying drawings:

FIG. 5 is an enlarged cross section taken along the lines V—V of FIG. 3;

FIG. 6 is an enlarged cross section taken along the lines VI—VI of FIG. 3;

FIG. 7 is an enlarged diametric cross section of a metal cap having a seal liner formed in its interior manufactured by the apparatus of the present invention;

FIG. 8 is a schematic plan view showing the positional relationship of a turn table with the forming dies and a cam surface;

FIG. 9 is an enlarged cross section taken along the lines IX—IX of FIG. 1; and

FIG. 10 is a fragmental, sectional elevation showing another embodiment of the apparatus of the invention, in which a modified means is provided for restricting a downward stroke of the outer, annular forming die.

DESCRIPTION OF THE PREFERRED EMBODIMENTS

Figure 1:
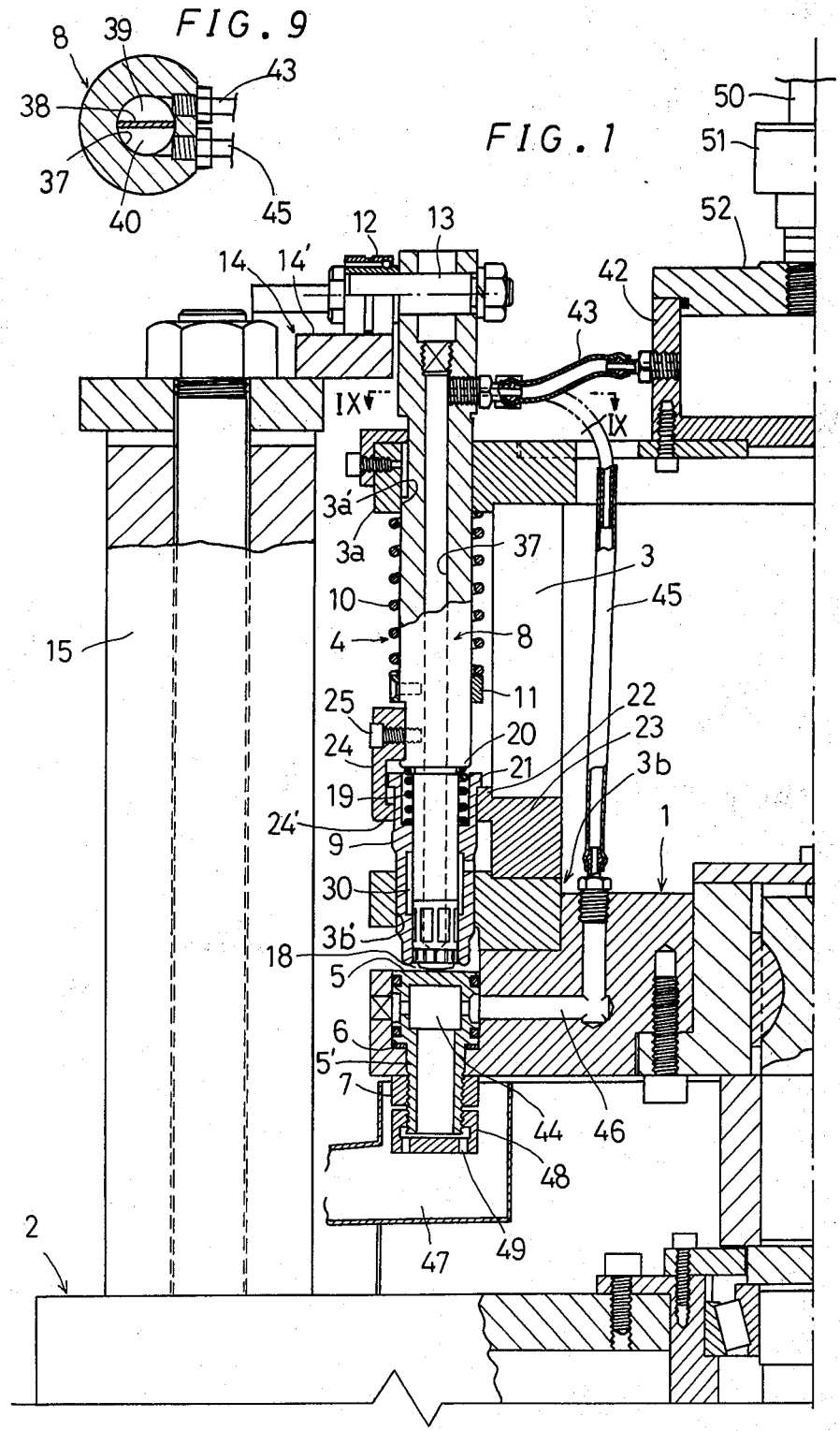
FIG. 1 is a longitudinal section of the seal liner forming apparatus according to the present invention.

Referring now to the drawings; first in particular to FIGS. 1 to 9, the apparatus of the invention comprises a turn table 1 supported by a machine frame 2 so as to turn conventionally. A pair of vertically spaced annular supports, that is, the upper support 3a and the lower support 3b, are disposed above and on the turn table 1, respectively, each of the annular supports 3a, 3b being arranged so as to rotate at the same speed with the turn table 1. The annular supports 3a, 3b are preferably connected together by a vertical wall 3.

A plurality of movable dies 4 are slidably supported, for example through holes 3a', 3b', by the annular supports 3a, 3b so as to reciprocate up and down. The movable dies 4 are annularly aligned at an equal space interval along the circumference of the turn table 1, as shown in FIG. 8. A plurality of stationary cooling dies 5 are embedded in the circumference of the turn table 1 and annularly aligned at an equal space interval in the same manner as the movable dies 4, so that each of the dies 5 is engageable with one of the movable dies 4 when it slides downward to take its lowermost position. Each of the stationary dies 5 has a hollow threaded shank 5' with which a clamp nut 7 is engaged. By tightening the nut 7, each die 5 is secured to the turn table 1. Fine adjustment of vertical position of each stationary die 5 can be made by selecting a desired thickness of a spacer 6 to be sandwiched between the die 5 and the turn table 1.

Each of the movable dies 4 consists of a cylindrical inner die or plunger 8 and an annular outer die 9 enclosing said inner die or plunger 8. Preferably, the upper cylindrical portion of each plunger 8 is slidably supported through each hole 3a' of the upper support 3a and the reduced, lower cylindrical portion thereof is slidably received within the annular die 9 which is slidably supported through the hole 3b' of the lower support 3b, as shown in FIG. 1. The plunger 8 is always urged to move downward by means of a compression spring 10 which surrounds the plunger and is interposed between the underside wall of the support 3a and a collar 11 secured to the plunger 8. Adjacent to the top end portion of the plunger 8 is provided a roller 12 which is supported by a horizontal shaft 13 mounted to the top end of the plunger, so that when the annular supports 3a, 3b and the turn table 1 rotates together, the roller 12 comes into contact with a cam 14 so as to follow the upper cam surface 14' thereof. The cam 14 is rigidly secured to an upright pole 15 mounted on the frame 2. The cam 14 presents an arcuate configuration in the plan view as shown in FIG. 8. The cam surface 14' presents a substantially convex configuration, wherein a surface area between its front end 14a and the central portion 14c provides a smooth ascending slope while a surface area between the central portion 14c and the rear end 14b provides a smooth descending slope.

Thus, as the roller 12 runs on the cam surface 14', the plunger 8 is reciprocated up and down.

The lower end portion of the annular outer die 9 has such an external diameter substantially equal to the internal diameter of a cap shell 16 within which a seal liner is to be formed. The outer die 9 has an annular shoulder 17 internally formed therewith. A compression spring 19 is disposed within the outer die 9 and surrounds the preferably reduced, lower cylindrical portion of the inner die or plunger 8 inserted into the outer die 9. The spring 19 is interposed between an annular stepped portion 20 and the internal shoulder 17 of the plunger 8, so that the annular die 9 is always urged toward the stationary die 5. The outer die 9 has a radially extending annular flange 21 which is engageable with a stopper 22 formed with a block 23 mounted on the lower support 3b, so that the downward movement of the outer die 9 is restricted by the stopper 22.

Figure 2:
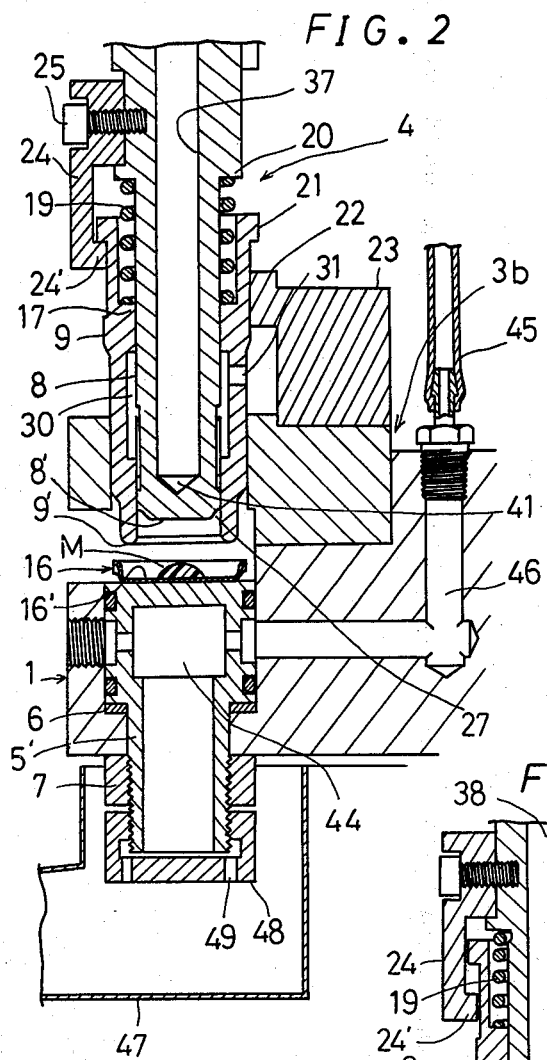
FIG. 2 is an enlarged section showing the first operation of the apparatus.

A suspension arm 24 having an engaging end 24' is mounted to the plunger 8 by a bolt 25. The engaging end 24' is disposed so as to be engageable with said annular flange 21 of the outer die 9 when the inner die or plunger 8 moves upward. As a result, the annular die 9 is pulled upward by the suspension arm 24 when the plunger 8 is moved upward. The suspension arm 24 also serves to prevent the plunger 8 from being disengaged out of the annular die 9 when the plunger 8 moves upward, as best shown in FIG. 2.

Figure 3:
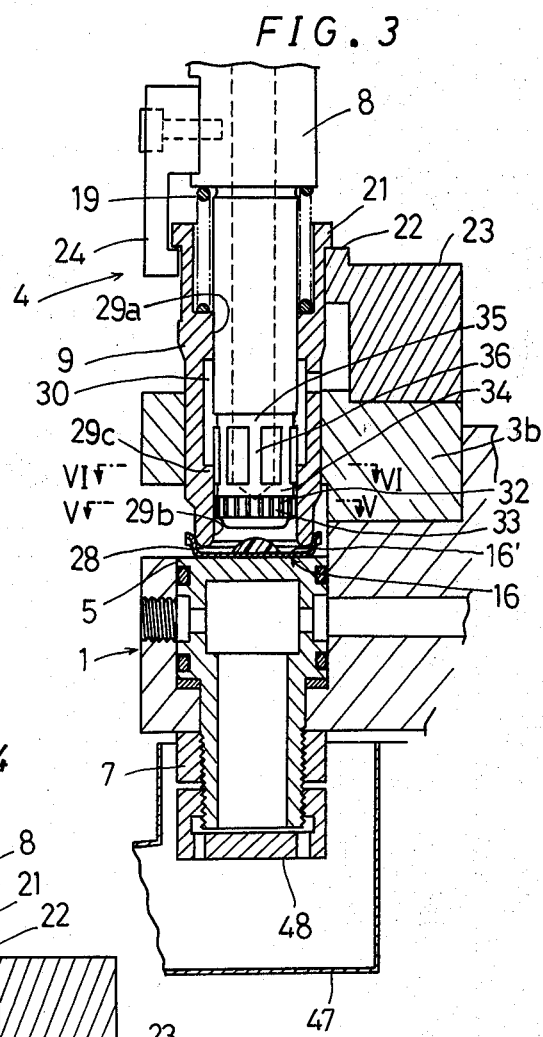
FIG. 3 is a similar view to FIG. 2, showing the second operation of the apparatus.
Figure 4:
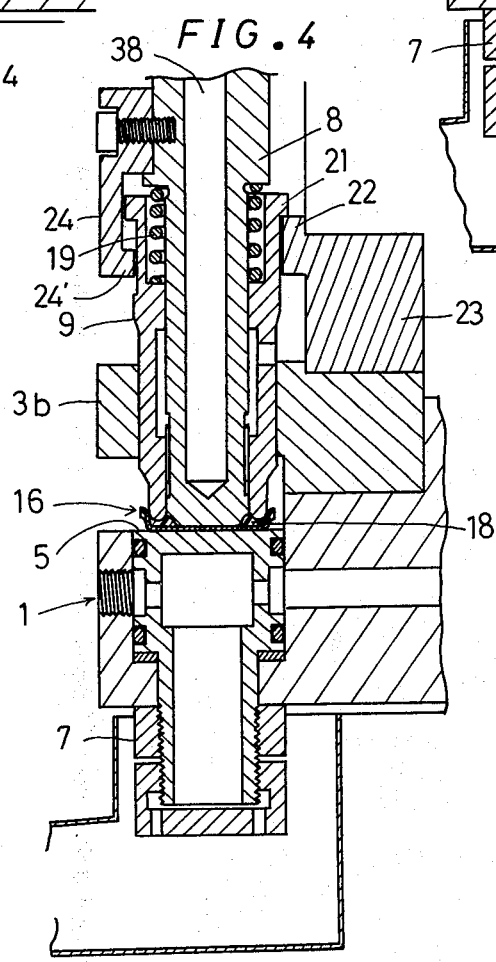
FIG. 4 is also a similar view to FIG. 2, showing the third operation of the apparatus.

The positional relation between the annular flange 21 and the stopper 22 should be so arranged that when the annular flange 21 is in contact with the stopper 22, the annular die 9 takes its lowermost position in which the lower end 9' (FIG. 2) of the die 9 is not in contact with the interior surface 16' (FIG. 2) of the cap shell 16 placed on the stationary die 5, but provides a certain predetermined space or clearance 28 between the surface 16 and the end 9', as shown in FIG. 3. On the other hand, the plunger 8 is so arranged that when it takes its lowermost position, the lower end surface 8' (FIG. 2) thereof can get into contact with the interior surface 16' of the cap shell 16. Thus, when the plunger 8 takes its lowermost position, a measured amount of fused thermoplastic material (M), preferably polyethylene material, charged on the interior surface 16' of the cap shell is forcibly spread in the radial directions over the surface 16' by the end surface 8' of the plunger, and, consequently, a thin central portion 26a of a seal liner 26 if formed, as shown in FIG. 4.

An annular recess 27 (FIG. 2) is formed in the circumference of the end surface 8' of the plunger 8, so that the recess 27 is communicated and cooperates with the aforesaid space or clearance 28 (FIG. 3) to provide an annular foaming space or chamber 18 (FIG. 1) which serves to form an outer, thicker annular pad portion 26b of the seal liner 26, as best illustrated in FIG. 7. The configuration of said foaming chamber 18 is substantially the same with that of the annular pad portion 26b to be molded. The thickness of the annular pad portion 26b can be adjusted by selecting a level position of the stopper 22.

In order to secure a correct and smooth slidable relation between the external cylindrical surface of the plunger 8 and the internal cylindrical surface of the annular die 9, the axial length of the slide surfaces between the inner and the outer dies 8, 9 should be sufficient. For the same purpose, the internal cylindrical surface of the outer die 9 may preferably be formed with an upper slide surface 29a and a lower slide surface 29b, so that a tubular hollow space 30 can be provided between the upper and the lower slide surfaces 29a, 29b. At least one port 31 (FIG. 2) is formed in the cylindrical wall of the outer die 9 so as to be communicated with said hollow space 30 for the purpose to be hereinafter described.

A gas discharging means is provided for discharging gas which is produced when the thermoplastic material, preferably polyethylene material (M) placed within the cap shell 16 is foamed. Preferably, the gas discharging means is in the form of a plurality of axially extending narrow grooves 32 (FIG. 3) formed in the cylindrical slide surface 33 (FIG. 3) of the lower end portion of the inner forming die or plunger 8, so that each of the grooves 32 is communicated with the annular recess 27 formed in the lower end portion of the plunger 8. Each of the narrow grooves 32 may preferably be 1.0 mm wide and 0.04 mm deep, since such a size does not permit undesirable penetration of the plastic material (M) into the grooves. The number of the grooves 32 may preferably be about sixteen. Further, the grooves 32 may preferably extend in parallel to one another and be spaced part from the neighboring ones at an equal space interval.

As illustrated in FIG. 3, adjacent to the upper side of said cylindrical slide surface 33 in which the narrow grooves 32 are formed, a first (lower) annular passage 34 for the produced gas is formed so as to surround the cylindrical outer surface of the plunger 8 at such a level position lower that the upper extremity 29c of the lower slide surface 29b of the outer die 9 at its lowermost position, while a second (upper) annular passage 35 for the gas is formed so as to surround the cylindrical surface of the plunger 8 at a level position higher than the upper extremity 29c of the lower slide surface 29b of the outer die 9 at its lowermost position. In other words, the upper passage 35 is communicated with the hollow space 30. Further, the upper and the lower annular passages 34, 35 are intercommunicated with each other through a plurality of axial passages 36. The axial passages 36 may preferably be eight in number, each being 1.5 mm wide and 1.0 mm deep. As a result, each of the narrow grooves 32 of the plunger 8 is communicated with the atmosphere through the passages 34, 36, 35, the annular hollow space 30, and the port 31, resulting in that the gas produced can be discharged into the atmosphere.

A plurality of narrow grooves (not shown) similar to the above described grooves 32 may be formed in the internal cylindrical slide surface of the annular die 9 for the same purpose as described in the foregoing. It is also possible to form the narrow grooves with both of the annular die 9 and the plunger 8.

The cylindrical inner forming die or plunger 8 is formed with an axial blind bore 37 which is separated by a partition 38 into two rooms constituting an inflow passage 39 and outflow passage 40 for cooling water or the like, as shown in FIGS. 1 and 9. The two passages 39, 40 are communicated with each other at the bottom 41 of the bore 37, as shown in FIG. 2. The cooling water may be supplied from a tank 42 mounted in the center of the upper support 3a as shown in FIG. 1. The inflow passage 39 is connected with the tank 42 through a supply hose or pipe 43, while the outflow passage 40 is connected to a cooling chamber 44 formed within the stationary die 5 through an outlet hose or pipe 45 and a conduit 46 formed in the turn table 1. The cooling water in the cooling chamber 44 may be discharged into a discharging channel 47 disposed beneath the turn table 1. Preferably, a flow regulator or cap nut 48 with outlet holes 49 may be provided at the lower end of the hollow shank 5' of the stationary die 5, so that the discharging of the cooling water can be adjusted. Incidentally, the cooling water can be continuously supplied into said tank 42 through a supply hose or pipe 50 connected to a known rotary joint 51 mounted to the cover member 52 of the tank 42.

Among various kinds of thermoplastic materials, polyethylene is most preferable for the seal liners to be formed within the metallic cap shells for bottles and the like, since polyethylene does not require such additives that are harmful to man's health when they dissolve into contents in bottles and the like container. Thus, in the following description, the term "polyethylene" is used for representing the materials to be utilized in the present invention. However, the scope of the invention should not be limited to utilization of polyethylene but may be applied to other known thermoplastic materials such as disclosed in Japanese Patent Publication No. 48-19386.

In operation, cap shells 16 with a measured amount of polyethylene (M) placed therein are continuously supplied onto each of the stationary dies 5 by a known automatic feeding mechanism (not shown) such as disclosed in U.S. Pat. No. 3,135,019 to Aichele. It is advantageous to employ such metallic cap shells whose interior surface 16' is pre-coated with polyethylene film. A mixture of polyethylene and one or more of known foaming agents such as disclosed in Japanese Patent Publication No. 48-19386, which is preferably preheated to about 170° C. to 210° C. and brought into fused phase, is supplied in a measured amount onto the interior surface 16' of each cap shell by means of a known supply nozzle (not shown) connected to a known screw feeder (not shown) such as disclosed in U.S. Pat. No. 3,135,019. The metallic cap shell 16 may preferably be preheated to about 130° C. to 170° C. by a suitable heating means (not shown), prior to being charged with said measured amount of the fused polyethylene (M).

As will be apparent from FIGS. 1 and 8, as the turn table 1 rotates, some of the rollers 12 each connected to the respective plunger 8 come into engagement with the cam surface 14', while the remainder rollers 12 likewise connected to each of the remainder plungers 8 become disengaged from the cam surface 14'. More particularly, as a certain roller 12 comes into contact at 14a with the cam surface 14', the roller starts to run up on the ascending slope existing between the end 14a and the central summit portion 14c, resulting in that the plunger 8 is raised upwardly. When the roller reachs the central summit portion 14c, the plunger takes its uppermost position as shown in FIG. 2. In this position, the outer die 9 also takes its uppermost position since the engaging end 24' of the suspension arm 24 pulls up the annular flange 21 of the outer die 9. Thus, at this position, a clearance between the lower end of the movable die 4 and the upper end of the stationary die 5 is largest and sufficient enough to permit the supply of a cap shell 16 to be worked on, to be deposited onto the stationary die 5. By adjusting said clearance, it is also possible to carry out said supply of a cap shell 16 at a position (A) near the central portion 14c, as shown in FIG. 8.

As the roller 12 runs down on the descending slope existing between the sumit portion 14c and the rear end 14b, the plunger 8 is gradually moved downward together with the outer die 9 under expanding functions of the springs 10. However, the outer die 9 is first prevented from its downward movement when its flange 21 contacts the stopper 22, while the plunger continues to move downward. At the moment when said flange 21 contacts the stopper 22, the outer die 9 takes its lowermost position and the lower end portion of the die 9 is inserted into the interior of the cap shell, while the plunger is still on the way to its lowermost postion, as long as its roller 12 is on the cam surface 14'. In other words, at the moment when the outer die 9 takes its lowermost position, the lower end 8' of the plunger is located at a higher level position than the lower end 9' of the die 9, as shown in FIG. 3. When the cylindrical lower end portion of the outer die 9 is inserted into the interior of the cap shell 16, the external wall surface of said portion of the die 9 is in contact with the internal wall surface of the cap shell, since the external diameter of said cylindrical lower end portion of the die 9 is substantially equal to the internal diameter of the cap shell 16. At the lowermost position of the outer die 9, there is provided a predetermined constant clearance 28 (FIG. 3) between the lower end 9' (FIG. 2) of the die 9 and the upper surface of the stationary die 5, because the outer die 9 is restricted by the stopper from further downward stroke and also restricted from its upward stroke by the expanding function of the spring 19.

When or just before the roller 12 leaves the rear end 14b of the cam surface 14', the plunger 8 is urged downward by the compression spring 10 to take its lowermost position as shown in FIG. 4.

As will be easily understood from the forgoing description, the fused polyethylene material (M) placed on the interior surface 16' of the shell is forcibly spread in the radial directions by the flat lower end surface 8' of the inner forming die 8 as the die 8 is moved downward to its lowermost position, whereby a thin disk-shaped portion 26a of the liner 26 is formed. While, the greater portion of the material (M) spread by said end surface 8' is forcibly pushed into an annular foaming space or chamber 18 enclosed by the end wall 9' of the annular die, the annular recess 27 (FIG. 2) of the inner die 8, and part of the interior surface 16' of the shell. In this closed, annular-shaped foaming chamber 18 of a constant capacity thus obtained, the final foaming process of the polyethylene (M) is carried out in order to mold a thicker, annular cushion pad portion 26b of the seal liner.

During the above foaming process, the thin central, disk-shaped portion 26a of the liner is immediately cooled and hardened because the portion 26a is sandwiched between the inner die 8 and the stationary die 5 both cooled down by the cooling water. The portion 26a thus obtained is restricted from being foamed, and therefore, is rigid enough and almost transparent. On the other hand, the polyethylene (M) is well foamed to provide the thicker, annular pad portion 26b having a good cushioning property. Further, the gas produced in this chamber can be discharged through the narrow grooves 32 which are in communication with the chamber 18. As a result, the material (M) is never prevented by any remaining gas in the chamber from being filled in every corner of the chamber. Thus, a uniform annular-shaped cushion portion 26b can be obtained.

The entire of the crown cap having the seal liner 26 formed therewith is further cooled as long as it is sandwiched between the dies 4, 5, and then finally removed from the turn table 1 at a desired position (B) such as shown in FIG. 8.

FIG. 10 illustrates a modified embodiment of the present invention, in which the lower end portion of the annular die 9 is formed with an annular shoulder 9a at such a level position where the upper marginal edge 16a of the cap shell placed on the die 5 is located, so that the downward movement of the outer die 9 is restricted by said marginal edge 16a. According to this construction, it is possible to dispense with the stopper 22 required in the first embodiment described in the foregoing.

Thus, according to the present invention, the foaming of the thicker, annular pad portion 26b of the liner is carried out in the closed foaming chamber 18 whose capacity does not change during the foaming process, resulting in that the cells in the portion 26b are uniform in size and distribution and that the fused material (M) is prevented from overflowing out of the cap shell 16.

Since the gas produced in the foaming chamber 18 can be discharged from the narrow grooves 32 to the atmosphere through the passages 34, 36, 35, 30 and 31, the gas does not remain in the foaming chamber 18, with the effect that the foamed material (M) can be filled in every corner of the chamber thereby to secure the accurate and uniform shaping of the thicker, annular pad portion 26b of the liner.

Further, according to the present invention, the gas discharging means is in the form of a plurality of narrow grooves 28 formed in the cylindrical slide surface 33 (FIG. 3). Such grooves 28 are easier to form than those gas discharging bores proposed in Japanese Laid-open No. 53-69786 referred to in the foregoing, thereby permitting a lower manufacturing cost of the forming die 4 as compared to said die having a plurality of gas discharging bores. Further, provision of the grooves 32 does not restrict a desired axial length of the slide surface 33, thereby permitting a good and accurate slidable relation between the inner die 8 and the outer die 9 and a good durability of the dies 8, 9. Further, it is easy to clear the grooves 32 when they are blocked by the material (M). In addition, the blocking material can be self-removed from the grooves 32 during the relative sliding movement of the inner die 8 and the outer die 9, since the grooves 32 are formed in the slide surface 33. Each of the grooves is so narrow as not to permit the fused material (M) to easily flow thereinto to block it. A long and narrow groove generally provides a great registance against the gas flow. However, according to the present invention, each of the grooves 32 is not excessively long but communicated with the enlarged gass flow passage 34, whereby a smooth gas discharge can be performed.

According to the present invention, the cooling system is provided for effectively cooling both of the movable die 4 and the stationary die 5. Especially, by adjusting the flow of the cooling water by means of the regulator 48, it is possible to maintain the constant cooling conditions which otherwise vary in accordance with temperatures of atmosphere, supplied material, or cooling water per se and/or a span of operation time, with the result that the produced seal liners are uniform in quality.

The present invention being thus described, it will be obvious that same may be varied in many ways. Such variations are not to be regarded as a departure from the spirit and scope of the present invention, and all such modifications as would be obvious to one skilled in the art are intented to be included within the scope of the following claims.

We claim:

1. An apparatus for forming seal liners of thermoplastic foaming material within closure cap shells comprising:

a plurality of movable dies each having an inner die and an annular outer die, each of said inner and outer dies being movable up and down, said inner die having a cylindrical lower end portion which is slidably disposed within said annular outer die and has a lower end wall for radially spreading a measured amount of fused thermoplastic foaming material placed on a horizontal wall of an interior surface of a cap shell, as said inner die takes its lowermost position, said annular outer die having a cylindrical lower end portion whose external diameter is substantially equal to an internal diameter of said cap shell, so that a cylindrical external circumferential wall of said cylindrical lower end portion is in contact with a substantially upwardly extending wall of said interior surface of the cap shell when said outer die is in its lowermost position, said inner die being so arranged as to still continue its downward movement to its lowermost position after said outer die has taken its lowermost position, means for restricting downward movement of said outer die so as to prevent its lower end wall from contacting said horizontal wall of said cap shell thereby to provide a certain constant clearance between said lower end wall of the outere die and said horizontal wall of said cap shell, an annular recess formed in a lower end circumference of said inner die, said annular recess being communicated with said clearance so that an annular foaming chamber of a constant capacity, for forming a thick annular pad portion of said seal liner, is formed beneath said lower end wall of the outer die when both of said outer and inner dies are in their lowermost positions, means for restricting upward movement of said outer die when said thermoplastic foaming material is forcibly pushed into said foaming chamber, a plurality of gas discharging grooves formed in a relatively slidable area existing between a cylindrical external surface of said cylindrical lower end portion of said inner die and a cylindrical internal surface of said cylindrical lower end portion of said outer die, said area being located above said annular foaming chamber and inwardly spaced apart from said upwardly extending wall of said interior surface of said cap shell, and said foaming chamber being communicated with the atmosphere through said gas discharging grooves.

2. The apparatus, as defined in claim 1, which includes an axial blind hole formed internally of said inner die for containing cooling fluid therein, said axial blind hole being separated by a partition into two water flow passages, a cooling system for cooling both of said movable dies and said stationary dies by use of continuously flowing cooling fluid, and said cooling system comprising a fluid supply tank, a first hose connecting said tank with an inflow passage formed within said inner die, a second hose connected at one end to an outflow passage formed within said inner die, said inflow passage and said outflow passage being communicated with each other, a cooling chamber formed within said stationary die, a conduit means for connecting said cooling chamber with said second hose, and a flow regulator for regulating outflow of said cooling water from said cooling chamber.

3. The apparatus, as defined in claim 1, wherein said plurality of gas discharging grooves are formed in a slide surface of said cylindrical external surface of said cylindrical lower end portion of said inner die.

4. The apparatus, as defined in claims 1 or 3, wherein gas discharging passages are provided between said inner die and said outer die, said passages being communicated with said grooves as well as the atmosphere.

5. The apparatus, as defined in claim 1, wherein said means for restricting downward movement of said outer die is in the form of a stopper means engageable with the outer die.

6. The apparatus, as defined in claim 1, wherein said means for restricting downward movement of said outer die is in the form of a shoulder engageable with an upper marginal edge of said upwardly extending wall of said cap shell.

7. The apparatus, as defined in claim 1, which includes
a plurality of stationary dies for supporting said cap shells,
each of said stationary dies being located so as to cooperate with one of said movable dies to sandwich said cap shell therebetween.

8. The apparatus, as defined in claim 7, wherein a cooling chamber is formed within each of said stationary dies, so that cooling fluid water can flow through said cooling chamber.

9. The apparatus, as defined in claim 8, wherein a flow regulating means is provided for regulating outflow of said cooling fluid from said cooling chamber.

10. The apparatus, as defined in claim 1, wherein said means for restricting upward movement of said outer die is in the form of a spring adapted to urge the outer die downwardly.

11. The apparatus, as defined in claim 1, wherein each of said plurality of movable dies is slidably supported by at least one support member mounted on a turn table.

12. The apparatus, as defined in any one of claims 1, 2 or 3, wherein
each of said inner dies is moved up and down by a cam mechanism.

13. The apparatus, as defined in claim 12, wherein said cam mechanism includes a roller mounted to each of said inner dies and a cam member having a cam surface engageable with said roller.

14. The apparatus, as defined in any one of claims 2, 7 or 8, wherein each of said stationary dies is embedded in a turn table rotatably mounted to a frame of the apparatus.

* * * * *